3,092,484
HERBICIDAL METHOD

Paul L. Salzberg, Wilmington, Del., assignor to E. I. du Pont de Nemours and Company, Wilmington, Del., a corporation of Delaware
No Drawing. Filed Sept. 15, 1960, Ser. No. 56,116
3 Claims. (Cl. 71—2.6)

This invention relates to the use of certain 1,1,5,5-tetramethyl-3-phenyl dithiobiurets as pre-emergence herbicides and to novel herbicidal compositions employing such compounds.

There exists throughout all industry, and in particular in the field of agriculture, a continued need for the discovery of chemical compounds that are effective in controlling the growth of weeds. Especially important is the need for pre-emergence herbicides, i.e. herbicides that are applied to soil before planting and act to prevent the emergence of weeds. It is also important that such herbicides have a favorable safety factor in the soil for farm crops and lawn grasses so that the crops or grasses will not be injured with the effective weed control.

According to the present invention, a narrow class of substituted dithiobiurets has been found that is characterized by outstanding herbicidal activity, particularly in pre-emergence application.

The substituted dithiobiurets employed in the herbicidal compositions and methods of the present invention are those represented by the following formula:

(1)

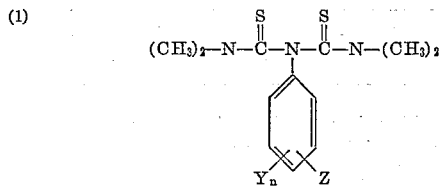

where Y is hydrogen or halogen; n is 1, 2 or 3; and Z is hydrogen, nitro or alkyl of 1 through 4 carbon atoms.

The substituted dithiobiurets employed in the practice of this invention can be prepared by various methods. For example, they can be prepared by the reaction of a suitably substituted thiuram monosulfide with an appropriate aromatic isocyanate, as follows:

(2)

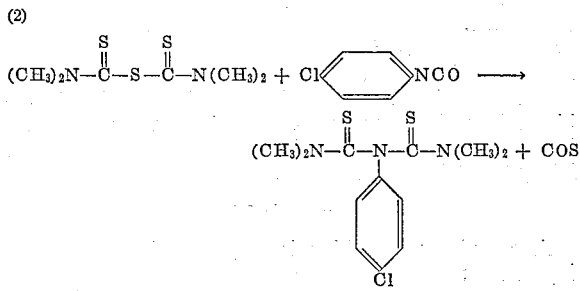

This route is described in detail in German Patent 808,710.

It is to be understood that this equation is for purposes of illustration only, and that by the proper choice of reactants the various other substituted dithiobiurets of Formula 1 can be prepared.

The compounds as above described can be volatilized and applied as fogs to the locus or area to be protected or directly to vegetation which is to be killed, or they can be very finely divided and applied as dusts. However, for all practical purposes it will be preferred that the compounds be formulated by admixture with suitable "pest control adjuvants" to provide compositions in the form of solutions, dusts, water dispersible powders, and aqueous dispersions or emulsions.

The herbicidal compositions of the invention are prepared by admixing one or more of the biurets of the invention defined heretofore, in herbicidally effective amounts, with a conditioning agent of the kind used and referred to in the art as a "pest control adjuvant" or "modifier" in order to provide formulations adapted for ready and efficient application to soil or weeds (i.e., undesirable plant growth) using conventional applicator equipment.

By the term "pest control adjuvant," I mean a substance which is capable of presenting and aiding in the presentation of an active compound to the pest, in this case, the undesirable plants. The term "adjuvant" is well established in the art where it is recognized that an active agent or toxicant is in itself of little practical utility for combatting pests unless it is presented in the form suitable for effecting intimate contact of the agent with the pest. Thus additional material or materials are employed in the formulation of an active agent to yield a suitable pest control composition, such materials being adjuvants. Such materials are also sometimes called conditioning agents since they are materials which are added to the active ingredient to assist in bringing it into a condition suitable for application.

Pest control adjuvants such as the dusts, solvents, wetting, dispersing and emulsifying agents set out in U.S. Patent 2,426,417 can be employed in preparing the herbicidal compositions of the present invention. Other wetting, dispersing, and emulsifying agents such as those listed in detail in Bulletin E 607 of the Bureau of Entomology and Plant Quarantine of the U.S. Department of Agriculture and such as those set out in an article by McCutcheon appearing in Soap and Sanitary Chemicals, July, August, September, and October 1955, may also be used.

Granule or pellet compositions can be prepared by mixing the active material in finely divided form with clays (with or without water soluble binders), moistening the mixture with 15-20% water, extruding the mass under pressure through an orifice, then cutting the extrusions to size before drying to yield pellets or first drying, then granulating to yield granules. Alternatively granules, but usually not pellets, can be made by spraying active material in solution or suspension upon the surface of a preformed granule of clay, vermiculite, or other suitable granular material. When the active material is soluble in the spray medium so it can penetrate into the pores of the granular carrier no binding agent is needed. When it is insoluble and in suspension form, a binder is needed to adhere the active material to the surface. The binder can be soluble such as goulac, or dextrin or colloidally soluble such as swollen starch, glue or polyvinyl alcohol. The final step in either case is to remove the liquid medium, whether solvent or carrier.

Dust compositions of the invention contain one of the biurets of the invention in admixture with a finely divided carrier or dust such as talc, pyrophyllite, natural clays, diatomaceous earths, and other powdered diluents such as those set out in the aforementioned U.S. patent.

Water dispersible powders of the invention can be prepared by admixing one or more of the compounds of the invention with one or more surface-active dispersing and wetting agents and a finely divided solid carrier or dust such as those mentioned heretofore, the surface-active agents being used in amounts sufficient to impart water dispersibility to the powder.

The content of the active compound or compounds of the invention in the pest control compositions will vary according to the manner in which and the purpose for which the composition is to be applied but, in general, will be from 0.5 to 95% by weight of the composition.

Water dispersible liquid compositions can be prepared by incorporating with the substituted biurets and surface-active dispersing, wetting and emulsifying agents various organic liquids such as furfural, methanol, isopropanol, isobutanol, xylol, cresol, cyclohexanol, acetone, methylethylketone, kerosene, trichloroethylene, dimethylformamide, dimethylacetamide, alkylated naphthalenes, and the like.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds or alternatively the application can be made in advance of an anticipated weed infestation to prevent such infestation. Thus, the compositions can be applied as aqueous foliar sprays but can also be applied as sprays directly to the surface of the soil. Alternatively, the dried powdered compositions can be dusted directly on the plants or on the soil. For some purposes as in the treatment on ponds and lake bottoms, it will be convenient to use a pellet form of the composition.

The active ingredients are, of course, applied in amount sufficient to exert the desired herbicidal action. The amount of herbicidally active compounds present in the compositions that are actually applied for destroying or preventing weeds will vary with the herbicidal activity of the active ingredients, the purpose for which the application is being made (i.e., whether for short term or long term control), the manner of application, the particular weeds for which control is sought, and like variables. In general, the herbicidal compositions as applied in the form of a spray or a dust will contain from about 0.02% to 95% by weight of the herbicidally active ingredient.

In order that the invention may be better understood, the following examples are given in addition to the examples already given above:

Example 1

A total of 153.5 parts by weight of p-chlorophenyl isocyanate is added to 1000 parts by weight of dry xylene containing 208 parts by weight of tetramethyl thiuram monosulfide. This mixture is heated at reflux temperature until carbon oxysulfide no longer evolves from the reaction. Upon cooling, essentially pure 1,1,5,5-tetramethyl-2-p-chlorophenyl dithiobiuret (melting point 141–144° C.) crystallizes out of solution.

This dithiobiuret is formulated into a granular composition that is adapted for application by means of a fertilizer spreader or similar apparatus. The composition is readily prepared by mixing the ingredients with water to form a paste. The paste is then extruded, dried and ground to give the desired granular size, preferably in the order of ⅓₂ to ¼ inch diameter.

| | Percent |
|---|---|
| 1,1,5,5-tetramethyl-3-p-chlorophenyl dithiobiuret | 10 |
| Sodium lignin sulfonate | 10 |
| China clay | 80 |

This compound gives excellent control of broadleaf and grassy weed infestation in lumber yards when applied at the rate of 35 pounds of the dithiobiuret component per acre by means of a fertilizer spreader. A large variety of weeds is controlled in this manner, including crabgrass, foxtail, wild rye, wild barley, velvet leaf, pigweed, flower-of-an-hour, barnyard grass, horseweed, and black-eyed Susan.

Examples 2 through 12

The following dithiobiurets are prepared in accordance with the procedure of Example 1 by substituting molecular equivalent amounts of the suitably substituted isocyanates listed below for the p-chlorophenyl isocyanate employed in Example 1.

These dithiobiurets, when used in place of the 1,1,5,5-tetramethyl-3-p-chlorophenyl dithiobiuret in the granular composition of Example 1, and applied in accordance with the procedure of Example 1 to weed infested areas, give excellent weed control.

| Example | Isocyanate and pts. by wgt. | Product Obtained |
|---|---|---|
| 2 | phenyl isocyanate (119) | 1,1,5,5-tetramethyl-3-phenyl diothiobiuret. |
| 3 | p-chlorophenyl isocyanate (153.5). | 1,1,5,5-tetramethyl-3-(p-chlorophenyl) dithiobiuret. |
| 4 | 3,4-dichlorophenyl isocyanate (188). | 1,1,5,5-tetramethyl-3-(3,4-dichlorophenyl) dithiobiuret. |
| 5 | 2,4,5-trichlorophenyl isocyanate. | 1,1,5,5-tetramethyl-3-(2,4,5-trichlorophenyl) dithiobiuret. |
| 6 | p-cumyl isocyanate (161) | 1,1,5,5-tetramethyl-3-(p-cumyl phenyl) dithiobiuret. |
| 7 | 3-nitro-4-chlorophenyl isocyanate (198.5). | 1,1,5,5-tetramethyl-3-(3-nitro-4-chlorophenyl) dithiobiuret. |
| 8 | p-bromophenyl isocyanate (198). | 1,1,5,5-tetramethyl-3-(p-bromophenyl) dithiobiuret. |
| 9 | 3-chloro-p-tolyl phenyl isocyanate (167.5). | 1,1,5,5-tetramethyl-3-(3-chloro-p-tolyl phenyl) dithiobiuret. |
| 10 | 2,4-dichlorophenyl isocyanate (167.5). | 1,1,5,5-tetramethyl-3-(2,4-dichlorophenyl) dithiobiuret. |
| 11 | o-chlorophenyl isocyanate (153.5). | 1,1,5,5-tetramethyl-3-(o-chlorophenyl) dithiobiuret. |
| 12 | m-tolyl isocyanate (133) | 1,1,5,5-tetramethyl-3-(m-tolyl) dithiobiuret. |

Example 13

This example illustrates the use of these dithiobiurets as pre-emergence and post-emergence crop herbicides. The listed wettable powder formulations are prepared by initimately mixing the listed ingredients using conventional mixing equipment, and then grinding the mixtures to give powders having average particle sizes less than about 50 microns.

| | Percent |
|---|---|
| 3 - (3,4-dichlorophenyl)-1,1,5,5-tetramethyl-2,4-dithiobiuret | 80 |
| Alkyl naphthalene sulfonic acid, sodium salt | 1.5 |
| Methyl cellulose low viscosity | 0.25 |
| Attapulgite clay | 18.25 |

This composition is extended with water to form an aqueous spray containing 1% by weight of the active dithiobiuret ingredient. When applied at a rate of 1.5 pounds of active dithiobiuret ingredients per acre to respective fields sown in cotton and corn, good pre-emergence weed control is obtained with no visual injury to the economic crops.

In a different application, the formulation listed above is extended with 100 gallons of water and applied at the rate of 2 pounds of active dithiobiuret ingredient per acre to an established lawn containing bluegrass, bentgrass, and fescue. Excellent pre-emergence control is obtained of annual grasses, including crabgrass, silver crabgrass, and annual bluegrass.

When applied at a rate of 6 pounds of active dithiobiuret ingredient per acre to seedling crabgrass, severe injury of the weedy grasses is obtained without noticeable injury to establish turf grasses.

Example 14

A granular composition is prepared of the following ingredients:

| | Percent |
|---|---|
| 1,1,5,5-tetramethyl-3-phenyl dithiobiuret | 2 |
| Granular 4–10 mesh expanded vermiculite | 98 |

This granular mix is prepared by dissolving the dithiobiuret component in solvent and spraying upon the vermiculite while tumbling the latter for good distribution, followed by drying.

The resulting granules are applied by hand at the rate of 35 pounds of active dithiobiuret ingredient per acre for the control of undesirable vegetation around electric power stations and bridge abutments. Crabgrass, foxtail, ragweed, goosegrass, annual ragweed, pigweed, and wild mustard are among the various weed species that are controlled by this application.

Example 15

An aqueous dispersion is prepared having the following ingredients:

| | Percent |
|---|---|
| 1,1,5,5 - tetramethyl-3-(2,4,5-trichlorophenyl)dithiobiuret | 25 |
| Sodium lignin sulfonate | 15 |
| Hydrated attapulgite | 2 |
| Water | 58 |

This composition is mixed and pebble milled or sand milled until the active dithiobiuret ingredient is substantially all below 5 microns in particle size.

The above formulation is applied in 30 gallons of water at the rate of 2.5 pounds of active dithiobiuret ingredient per acre for the control of annual grass and broadleaf weeds in a privet nursery.

Example 16

Pellet compositions are prepared of the following ingredients:

| | Percent |
|---|---|
| 1,1,5,5-tetramethyl-3-(p-bromophenyl) dithiobiuret | 25 |
| Anhydrous sodium sulfate | 10 |
| Sodium lignin sulfonate | 10 |
| Calcium magnesium bentonite | 55 |

This composition is blended and micropulverized, then moistened with 15–20% water and extruded. The extrusions are cut to yield pellets which are then dried.

When this formulation is applied at the rate of 35 pounds of active dithiobiuret ingredient per acre with a specially adapted fertilizer spreader, excellent control of broadleaf and grass weeds is obtained in fire lanes.

Example 17

A wettable powder composition is prepared of the following ingredients:

| | Percent |
|---|---|
| 1,1,5,5-tetramethyl-3-(m-tolyl) dithiobiuret | 50 |
| Dioctyl sodium sulfosuccinate concreted with sodium benzoate | 0.3 |
| Ditertiaryl acetylenic glycol | 0.4 |
| Oleyl ester of sodium isethionate | 1.0 |
| Kaolin clay | 48.3 |

This composition is prepared in the same manner as in Example 1. It is used as a lay-by spray after the last cultivation of corn or sugar cane. At the rate of 5 pounds of active dithiobiuret ingredient per acre in 25 gallons water, excellent control of pigweed, velvet leaf and ragweed is obtained, with no visible injury to the economic crop.

Example 18

| | Percent |
|---|---|
| 3 - (m-chlorophenyl)-1,1,5,5-tetramethyl-2,4-dithiobiuret | 80 |
| Alkyl naphthalene sulfonic acid sodium salt | 1.5 |
| Methyl cellulose low viscosity | 0.25 |
| Attapulgite clay | 18.25 |

This composition, when extended with water to form an aqueous spray containing 1% of active and sprayed pre-emergence in a cornfield at a rate of 2.5 pounds of active ingredient per acre gives good weed control without crop damage.

This application is a continuation-in-part of application Serial No. 619,088, filed October 29, 1956, now abandoned.

The invention claimed is:

1. A method for the control of undesirable plant growth which comprises applying to the locus to be protected from said undesirable plant growth, in an amount sufficient to exert a herbicidal action, a substituted dithiobiuret of the formula:

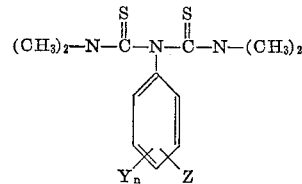

where Y is selected from the group consisting of hydrogen and halogen; $n$ is a positive whole number less than 4; and Z is selected from the group consisting of hydrogen, nitro and alkyl of 1 through 4 carbon atoms.

2. A method for controlling the growth of undesirable weeds in land planted to a row crop such as cotton or corn, without injury to the cotton or corn, which comprises applying to the locus to be protected from said growth of undesirable weeds, in an amount sufficient to kill said weeds, a substituted dithiobiuret of the formula:

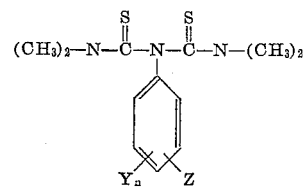

where Y is selected from the group consisting of hydrogen and halogen; $n$ is a positive whole number less than 4; and Z is selected from the group consisting of hydrogen, nitro and alkyl of 1 through 4 carbon atoms.

3. A method for the control of the growth of undesirable weeds in turf without injury to said turf which comprises applying to the locus to be protected from said growth of undesirable weeds, in an amount sufficient to kill said weeds, a substituted dithiobiuret of the formula:

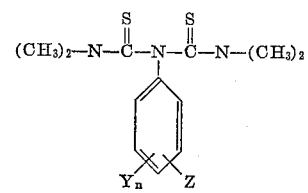

where Y is selected from the group consisting of hydrogen and halogen; $n$ is a positive whole number less than 4; and Z is selected from the group consisting of hydrogen, nitro and alkyl of 1 through 4 carbon atoms.

References Cited in the file of this patent

UNITED STATES PATENTS

| 2,704,244 | Goodhue et al. | Mar. 15, 1955 |
| 2,780,535 | Snyder | Feb. 5, 1957 |

FOREIGN PATENTS

| 808,710 | Germany | July 19, 1951 |

OTHER REFERENCES

Ahlgren et al., "Principles of Weed Control," copyright 1951, pages 267–268, John Wiley and Sons, Inc., New York.